United States Patent [19]
Afzali-Ardakani et al.

[11] Patent Number: 5,767,789
[45] Date of Patent: Jun. 16, 1998

[54] COMMUNICATION CHANNELS THROUGH ELECTRICALLY CONDUCTING ENCLOSURES VIA FREQUENCY SELECTIVE WINDOWS

[75] Inventors: Ali Afzali-Ardakani, Yorktown Heights; Michael John Brady, Brewster; Dah-Weih Duan, Peekskill; Christopher Adam Feild, Yorktown Heights; Harley Kent Heinrich, Brewster; Paul Andrew Moskowitz, Yorktown Heights, all of N.Y.

[73] Assignee: International Business Machines Corporation, Armonk, N.Y.

[21] Appl. No.: 521,902

[22] Filed: Aug. 31, 1995

[51] Int. Cl.[6] ......................................... H04Q 1/00
[52] U.S. Cl. ................... 340/825.54; 340/825.72; 340/572; 343/909
[58] Field of Search .................... 340/825.54, 825.34, 340/825.69, 825.72; 343/909; 361/800, 816, 818; 342/45

[56] References Cited

U.S. PATENT DOCUMENTS

| | | |
|---|---|---|
| 3,789,404 | 1/1974 | Munk . |
| 4,125,841 | 11/1978 | Munk . |
| 4,862,176 | 8/1989 | Voles ............................ 342/45 |
| 5,008,661 | 4/1991 | Raj ....................... 340/825.54 |
| 5,208,603 | 5/1993 | Yee .......................... 343/909 |
| 5,278,562 | 1/1994 | Martin et al. ..................... 342/1 |
| 5,397,863 | 3/1995 | Afzali-Ardakani et al. . |

OTHER PUBLICATIONS

B. A. Munk, Frequency-Sensitive (Or -Selective) Surfaces, Reflector Antennas and Their Feed Systems (12), pp. 600–605.

Primary Examiner—Edwin C. Holloway, III
Attorney, Agent, or Firm—Louis J. Percello; Ronald L. Drumheller

[57] ABSTRACT

Communication of information between the inside and the outside of an electrically conducting enclosure is performed through the use of a frequency selective surface on the electrically conducting enclosure, which permits passage of electromagnetic waves at particular frequencies, but prohibits waves of other frequencies from penetration. Thus, one or more objects contained within the electrically conducting enclosure, which include radio frequency tags attached to the objects containing information about the objects, may be monitored or interrogated by the transmission of an electromagnetic wave at the permitted frequency through the frequency selective surface. With such a system, control and inventory of enclosed objects may be performed while the EMI shielding function of the electrically conducting enclosure is maintained.

23 Claims, 8 Drawing Sheets

COMMUNICATION CHANNELS THROUGH ELECTRICALLY CONDUCTING ENCLOSURES VIA FREQUENCY SELECTIVE WINDOWS

FIELD OF THE INVENTION

This invention relates to wireless communications systems, and more particularly to wireless communications systems having at least one station enclosed in a shielding enclosure.

BACKGROUND OF THE INVENTION

A commonly seen electrically conducting, e.g., metallic, enclosure is the personal computer case, which is designed to confine the electromagnetic radiation generated from the circuit boards inside, and at the same time shield these circuit boards from electromagnetic (EM) interferences (EMI) impinging from outside. There are applications that demand such "isolating" electrically conducting enclosures, and at the same time require that a wireless communication channel be established between the inside and the outside of the electrically conducting enclosure.

It is well known that the magnitude of an EM wave decreases exponentially with penetration into a conductor. This decrease can be conveniently characterized by a "skin depth" (or, equivalently, "depth of penetration"), the depth at which the wave decreases to about 37% of its strength at the conductor surface. At three skin depths, the magnitude decreases to less than 5%. As a result, a conductor sheet that has a thickness on the order of the skin depth or more effectively blocks an incoming EM wave. The skin depth is inversely proportional to the square root of the product of the conductivity of the conductor and the operating frequency. For example, the skin depth of steel is about 5 to 7 mm (millimeter, $10^{-3}$ m) at 1 KHz (kiloHertz, $10^3$ Hertz), and about 5 to 7 μm (micrometer, $10^{-6}$ m) at 1 GHz (gigaHertz, $10^9$ Hertz). This implies that in order to link two stations through a steel box of, say, 2 mm thick, a low frequency EM field of 10 KHz or less has to be used. As another example, for a typical food-wrapping aluminum foil which is about 0.1 mm thick, a low frequency EM field of 150 KHz or less has to be used.

However, such low frequency radiations may not be useful for modern wireless communication systems where a large frequency bandwidth is required. At higher frequencies, in the gigahertz (GHz) regime, for example, the electromagnetic waves may be blocked (reflected) by an electrically conducting sheet that is only a few micrometers thick. In this situation, a wide-open aperture may be used to provide a communication channel. This method, however, leaves the object inside the enclosure susceptible to the EMI problems, and defeats the purpose of a shielding enclosure.

In the prior art, there are numerous applications where it is necessary to determine information about objects that are stored in electrically conducting enclosures. For example, in the transportation industry it may be necessary to itemize objects that are being shipped in electrically conducting containers such as railroad freight cars, airline cargo containers, etc. Presently, it is necessary to itemize objects when they are placed in or removed from the container. Alternatively, the container needs to be opened in order to acquire information about the contents.

In another application, information about an object contained in an electrically conducting enclosure might be needed. For example, food, clothing (such as shoes) or other commercial objects might be shipped or stored in electrically conducting boxes or wrapped in an electrically conducting coated wrapping. In order to obtain information about these objects, the information needs to be provided on the outside of the container or wrapping. Otherwise, the container or wrapping needs to be opened.

In a further application, the object may itself be an electrically conducting enclosure and information is desired about the internal parts of the object. For example, different models of a washing machine (or car) might have the same external electrically conducting container but might have different components (larger motor, etc.) inside. Unless the model information is on the outside of the object enclosure, the interior of the object has to be examined to determine the information.

In a still further application, inventory taken of objects within an electrically conducting enclosure in the prior art can only be accomplished by external tagging or by internal inspection. For example, electrical components such as printed circuit boards in a computer are often enclosed within an box to isolate electromagnetic interferences. Inventory of the boards within the enclosure would require external tagging or opening the enclosure for inspection. Similar situations exist in warehousing, metal tank farms, etc.

Since the prior art provides information about objects in a metal or metallic container by external tagging of the container or opening the container, an improved apparatus is needed to determine information within these metal or metallic containers without defeating the EMI shielding function of the container. Furthermore, because electrically conducting enclosures shield electromagnetic waves of high frequencies, the prior art fails to permit communication of information to objects within these enclosures at high frequencies.

SUMMARY OF THE INVENTION

Thus, an objective of this invention is an improved method and apparatus for communicating information about objects contained in an electrically conducting (RF shielded) enclosure.

A further objective of this invention is an improved method and apparatus for communicating information about objects contained in an electrically conducting enclosure for object inventory.

Yet another objective of this invention is an improved method and apparatus for communicating information about objects contained in an electrically conducting enclosure for object control.

In an attainment of the above objectives, the present invention provides an apparatus for communicating information between an inside and an outside of an electrically conducting enclosure like a metal enclosure which comprises a base station capable of transmitting and receiving an electromagnetic wave at a carrier frequency, one or more radio frequency tags associated with one or more objects inside the electrically conducting enclosure, wherein the tags have information about the objects and are capable of transmitting and/or reflecting the electromagnetic wave back to the base station with the information about the respective associated object modulated on that wave, an electrically conducting enclosure for enclosing the objects and, as a result, shielding the objects from electromagnetic radiation, and one or more frequency selective surface windows permitting the carrier wave to enter the enclosure and communicate with the tags and further permitting the wave transmitted or reflected by the tags to pass back through the enclosure to the base station. The frequency selective surface may be an enclosure aperture that is covered by an electrically conducting coated substrate with periodic patterns that are of a size and have a spacing so that the enclosure aperture resonates at the carrier frequency. The frequency selective surface may have a periodic pattern of patches, crosses, or strips, with the size, shape, and spacing of such adjusted to be resonant at the carrier frequency for one or more wave polarizations. Alternatively, the frequency selective surface may be one or more punched periodic aperture arrays that are put through the electrically conducting enclosure. The apertures can be of a size and have a spacing so that each periodic aperture array resonates at the carrier frequency for one or more wave polarizations.

In an alternative embodiment of the present invention, a first electromagnetic wave may cause the tag to change a state on a logic circuit on the tag, and a second electromagnetic wave may interrogate the tag to determine the state of the tag. The state of the tag may be used to determine information about the object.

The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWING

For a more complete understanding of the present invention, and the advantages thereof, reference is now made to the following descriptions taken in conjunction with the accompanying drawings, in which.

DETAILED DESCRIPTION OF A PREFERRED EMBODIMENT OF THE INVENTION

Figure 1:
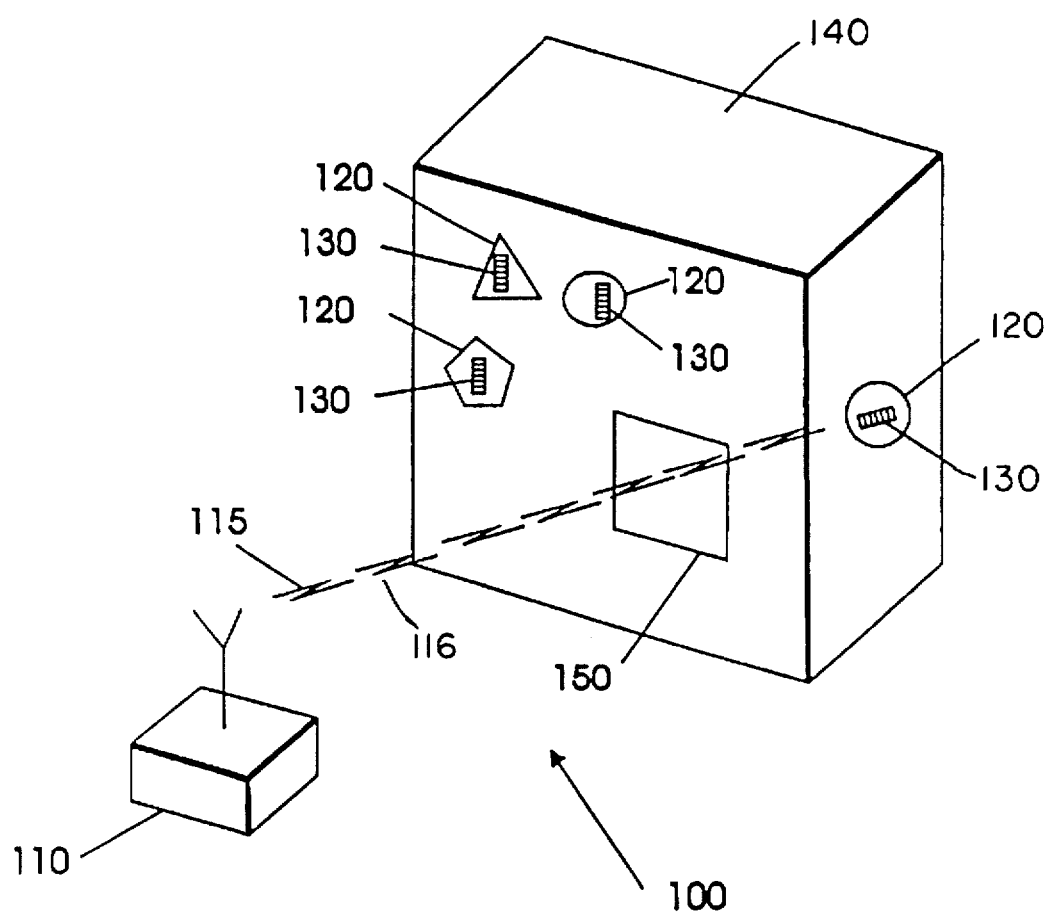
FIG. 1 illustrates a block diagram of a preferred embodiment of the present invention.

Since the apparatus for the most part is composed of electronic components and circuits known to those skilled in the art, circuit details will not be therefore explained to any greater extent than necessary for understanding and appreciating the underlying concepts of the present invention.

Refer now to the drawings wherein depicted elements are not necessarily shown to scale and wherein like or similar elements are designated by the same reference numeral through the several views.

It is well known that the magnitude of an EM wave decreased exponentially with penetration into a conductor. This decrease can be conveniently characterized by a "skin depth" (or, equivalently, "depth of penetration"), the depth at which the wave decreases to about 37% of its strength at the conductor surface. At three skin depths, the magnitude decreases to less than 5%. As a result, a conductor sheet that has a thickness in the order of the skin depth or more effectively blocks an incoming EM wave. The skin depth is inversely proportional to the square root of the product of the conductivity of the conductor and the operating frequency. For example, the skin depth of steel is about 5 to 7 mm (millimeter, $10^{-3}$ m) at 1 KHz (kiloHertz, $10^3$ Hertz), and about 5 to 7 μm (micrometer, $10^{-6}$ m) at 1 GHz (gigaHertz, $10^9$ Hertz). This implies that in order to link two stations through a steel box of, say, 2 mm thick, a low frequency EM field of 10 KHz or less has to be used. As another example, for a typical food-wrapping aluminum foil which is about 0.1 mm thick, a low frequency EM field of 150 KHz or less has to be used.

Referring to FIG. 1, there is illustrated apparatus 100 for communicating information between the inside and the outside of an electrically conducting enclosure 140, in which base station 110 is capable of transmitting 115 and receiving 116 electromagnetic wave (115, 116) at a carrier frequency. Base station 110, which is sometimes referred to as a reader, contains a radio frequency (RF) transponder that transmits and receives coded EM waves using one or more antennas, and additional electronics circuitry that performs required computations. Examples of base stations can be found in many RF identification (RFID) systems, electronic article surveillance (EAS) systems, security monitoring systems, etc. For example, see U.S. Pat. No. 4,656,463 to Anders et al filed on Apr. 21, 1983 and U.S. Pat. No. 4,075,632 to Baldwin et al filed on May 24, 1976 which are herein incorporated by reference in their entirety.

One or more objects 120 are contained in electrically conducting enclosure 140, and one or more radio frequency tags 130 are attached to objects 120, each containing information about each respective associated object 120.

Examples of electrically conductive enclosures 140 include any enclosure for containing objects 120 and capable of substantially preventing EM waves from penetrating the enclosure 140. Typically these enclosures 140 are more than two skin depths thick and are made of any electrically conductive material including: metals and composites (loaded and/or conductive polymers). Loaded polymers have a non conducting matrix (e.g. a polymer) with embedded conducting particles (e.g. metals and carbon/graphite). A conductive polymer is made from a conductive material, e.g., poly-para-phenylene, polythiophenes, polypyrroles. Electrically conductive enclosures 140 also include a box made of a non conductive material, e.g. plastic, coated with a conductor and/or other electrically conductive material.

Objects 120 can be any objects contained, stored, and/or shipped in an electrically conducting enclosure. For example, objects 120 can be any articles contained in railroad freight cars, airline cargo containers, the goods compartments of transportation vehicles (cars, trucks, ships, etc.), or warehouse storage containers. As a further example, objects 120 can be electronic circuit boards contained in computer cases 140, or components 120 (such as motors) in cars or washing machines that inherently are electrically conducting enclosures 140.

Tags 130 also find a variety of embodiments in many RFID, EAS, and security systems. A tag essentially comprises: (i) an EM wave receiving apparatus such as an antenna or a coil with a resonant circuit, (ii) an EM wave-reradiating mechanism that transmits in an active tag (with a battery) and reflects in a passive tag (without a battery), and, as an option (iii) electronic circuitry that performs necessary operations such as demodulation/modulation. If the electronic circuitry contains memory (storage) devices, information about the objects such as a serial number, manufacture date and site, and check-out status, etc., can be written and stored.

It is assumed that electrically conducting enclosure 140 has a thickness in the order of the skin depth or more such that incident electromagnetic wave 115 does not penetrate. A portion of electrically conducting enclosure 140 is comprised of frequency selective surface (FSS) window 150, which is transparent at a carrier frequency, and remains opaque at other frequencies. With FSS window 150, a communication channel may be established between the inside and the outside of enclosure 140 at the carrier frequency, and tags 130 may receive and re-radiate electromagnetic wave 116 back to base station 110, e.g., with the information about the respective associated object 120.

Note that the FSS window 150 can be made to pass two or even more frequencies while blocking all other frequencies. By doing this, an electromagnetic wave entering the enclosure 140 can have one or more first carrier frequencies while a wave leaving the enclosure 140 can have one or more second carrier frequencies. The shielding properties of the enclosure 140 are changed by the FSS window only at these first and second frequencies. At all other frequencies, the shielding of the enclosure along with the FSS window 150 are well maintained.

The key feature of FSS window 150, is that only the EM waves at a resonant frequency may penetrate; EM waves at all other frequencies are blocked. Therefore, when FSS window 150 is used as a portion of an electrically conducting enclosure, the electrically conducting enclosure's EMI shielding function is mostly retained. In contrast, an open aperture (not shown) allows EM waves at all frequencies to pass through, and hence defeats the purpose of shielding.

Figure 2A:
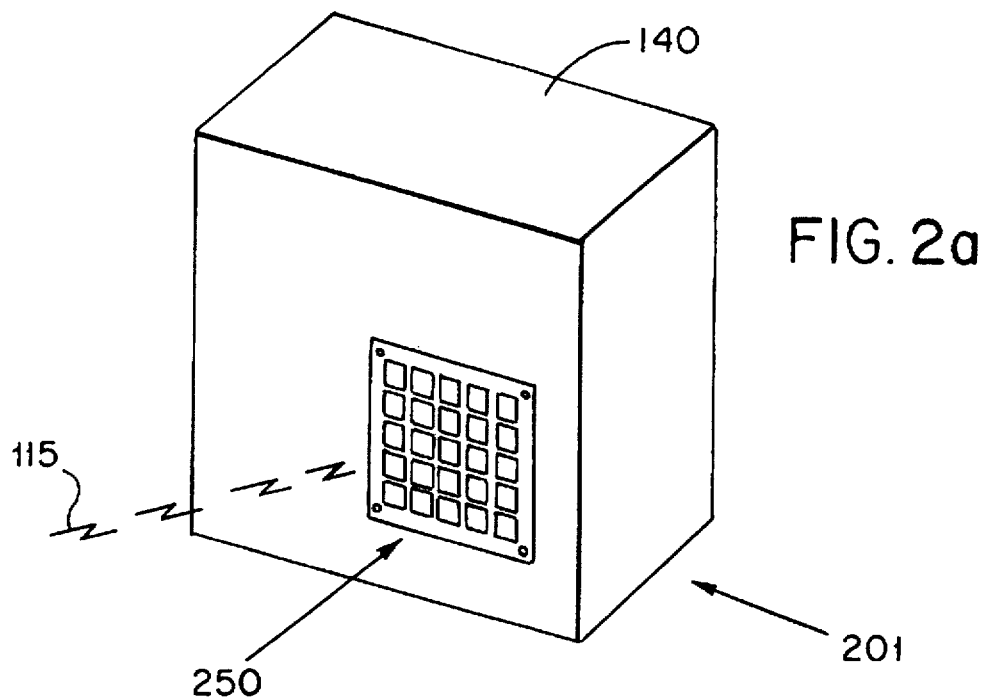
FIGS. 2a–b and 3a–d illustrate two implementations of the frequency selective surface of the present invention.
Figure 2B:
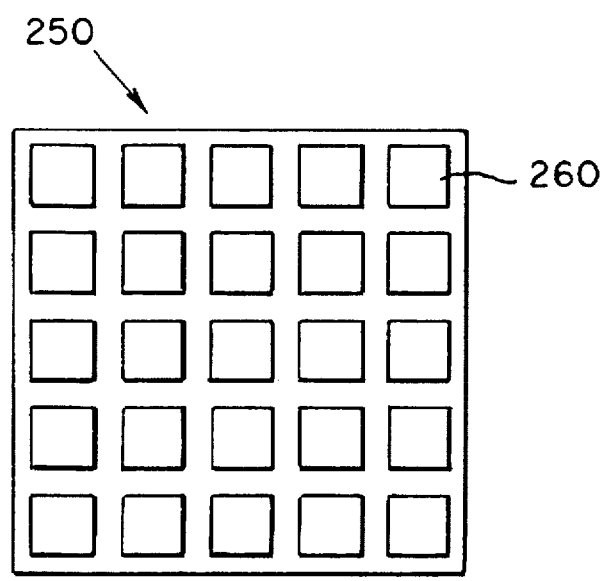
Figure 2B:
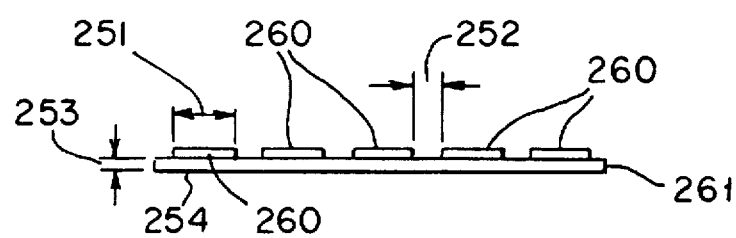

Referring to FIG. 2, there is illustrated one preferred embodiment of a FSS window 150 as a portion of electrically conducting enclosure 140. In this embodiment 201, as shown in FIG. 2a, a panel (not shown) is cut out from the enclosure 140's surface, and replaced with a FSS plate 250.

There are many ways to make FSS plate 250. For example, FSS plate 250 may comprise one or multiple layers of dielectric substrates, each coated with periodic metalization patterns. The element pattern (the pattern in a period, or, a cell) can be of any shape such as a rectangular patch, a cross, or a strip, etc., and is usually designed to be resonant at some frequency. Geometrical parameters such as the shape and size of a cell, and electrical properties such as the dielectric constants of the substrates can be fine tuned to produce an FSS that has the specified frequency response and polarization sensitivity. For example, strips are used to respond to waves of a certain polarization, and crosses or T-shapes are for dual-polarization operations.

An example of FSS plate 250 is shown in FIG. 2b, in which the element pattern is a rectangular patch. The size 251 of patches 260, the spacing 252 of patches 260, the thickness 253 of substrate 261, and the dielectric constant 254 of substrate 261 determines the frequency and bandwidth of the resonance. Design examples of FSS's can be found in the literature.

FSS's are known in the art. Please reference J. D. Kraus, "*Antennas*", Second Edition, pp. 601, *McGraw-Hill*, 1988, which is hereby incorporated by reference herein.

Referring next to FIGS. 3a–d, there are illustrated an alternative preferred embodiments for making an FSS as a portion of electrically conducting enclosure 140, in which electrically conducting enclosure 140 has its surface punched with periodic pattern 350. These punched holes 350 comprise an FSS.

Figure 3A:
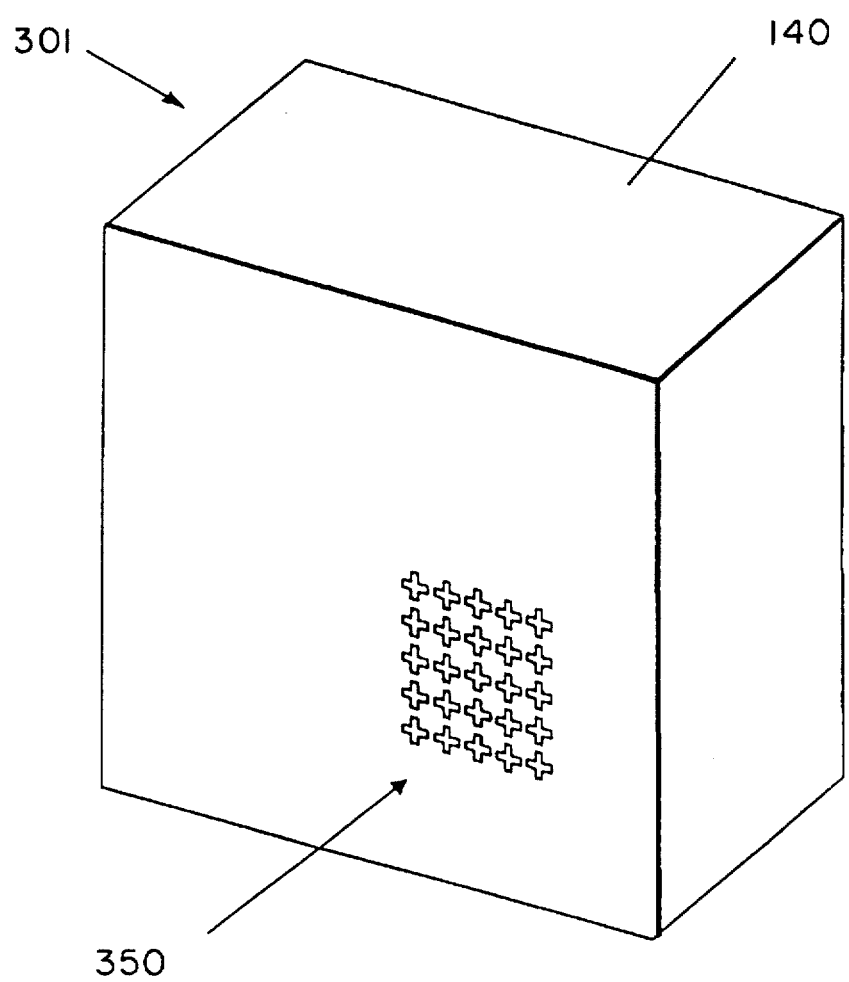
Figure 3B:
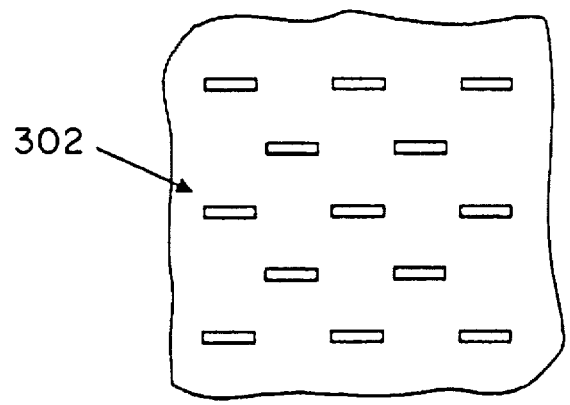
Figure 3C:
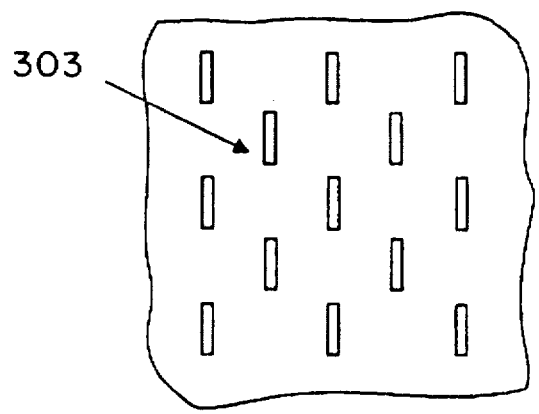
Figure 3D:
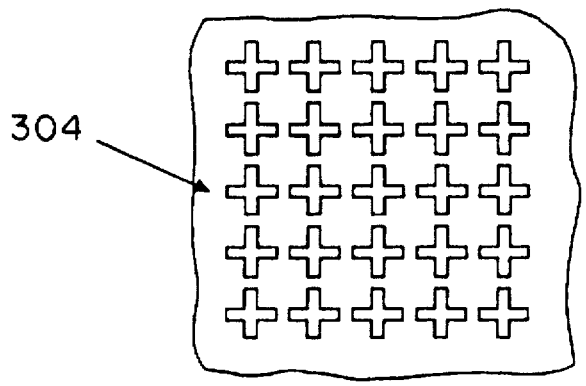

As in embodiment 201, one may choose different punched patterns to create an FSS with different functionalities. For example, referring to FIG. 3b, slots 302 are punched in the electrically conducting enclosure 140 to match one polarization only. If both polarizations of the incident wave need to be considered, one may punch a second separate slot array with orthogonal direction 303 as shown in FIG. 3c, or employ other element shapes such as cross slots 304 illustrated in FIG. 3d. In this situation, only one slot array 304 has to be punched for dual-polarization operation.

Figure 4:
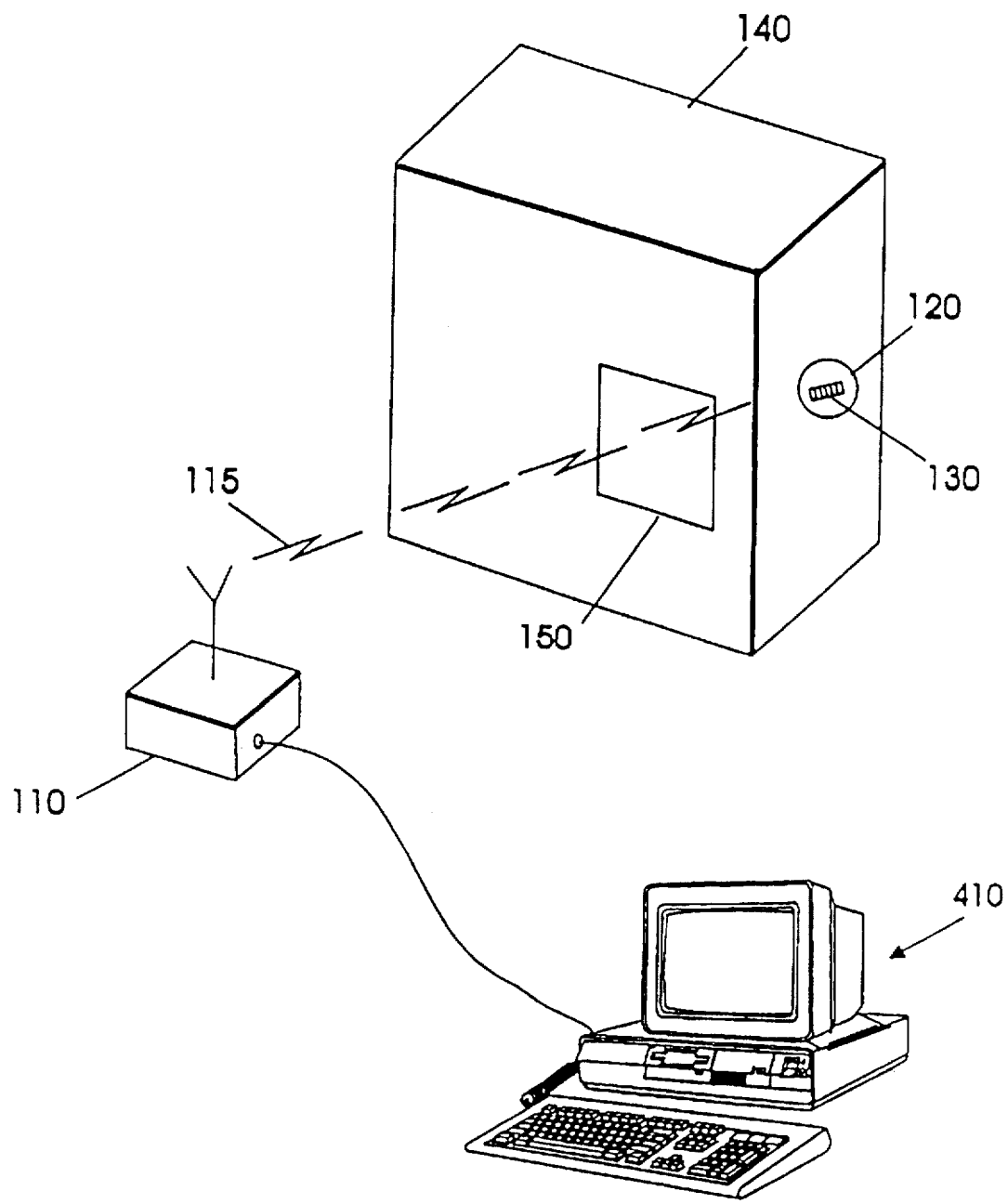
FIG. 4 illustrates using the present invention for object inventory.

With the present invention used for communicating information between the inside and outside of electrically conducting enclosure 140, one may find many useful applications. One such example is object inventory as illustrated in FIG. 4. In this scenario, base station 110 is connected to host computer 410, in which a database and a process algorithm is maintained so that a user may easily maintain a record of objects 120 contained in electrically conducting enclosure 140. Examples of such enclosures/objects include (i) air, train, or freight train cars, carts/goods, (ii) personal computer cases/circuit boards and other components, (iii) any electrically conducting containers that contain objects to be identified.

Figure 5:
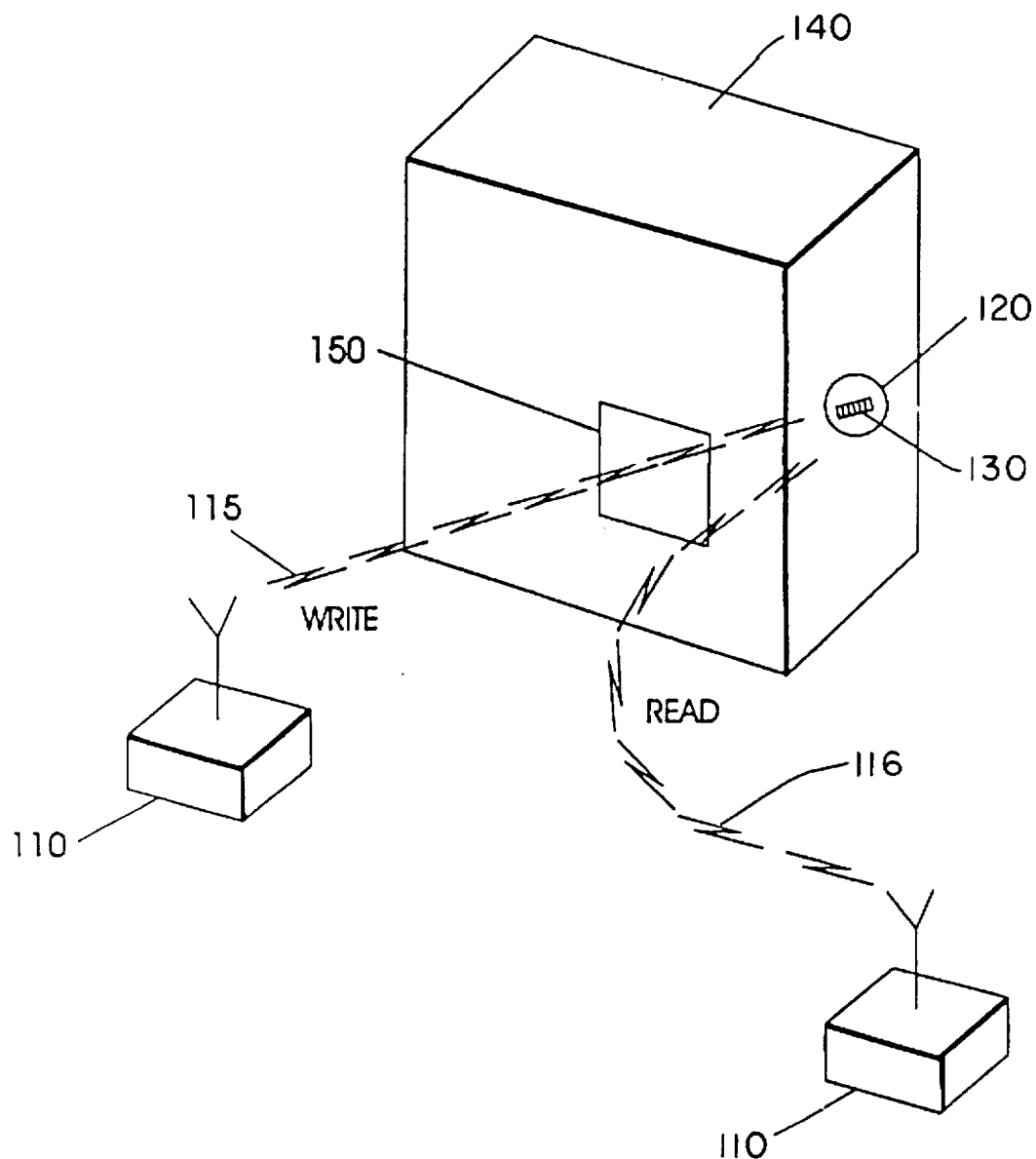
FIG. 5 illustrates using the present invention for object control.

Another application of the present invention is object control as illustrated in FIG. 5. In this scenario, one or more "states" that consist of an electronic "bit" and may be 0 or 1 are built into tag 130. An electronic bit is a circuitry that maintains a high or low voltage representing a logic state ("1" or "0"). To set a state, base station 110 sends 115 to tag 130 a "write" command by coding (or modulating) a specific signal on the EM carrier wave according to the communication protocol between base station 110 and tag 130. Receiving the "write" command, the tag circuitry sets the state bit into the desired state. Similarly, when later the state bit needs to be detected, base station 110 may send a "read" command to tag 130. Tag 130 inquires state bit and sends that information back 116 to base station 110. The detected object states may be used for the purposes of (i) anti-theft, (ii) process control, (iii) inventory assistance, and any other application where a historic flag is needed for further process.

Referring next to FIGS. 6a–d, there are illustrated alternative preferred embodiments for making an FSS as an insert of electrically insulating material into the enclosure 640. Therefore, the electrically conducting enclosure 640 has a window 660 with a surface that has a periodic dielectric pattern 650 on the window surface. This periodic pattern 650 comprises an FSS with locations on the pattern having one or more different dielectric constants ($\epsilon 1$, $\epsilon 2$).

Figure 6A:
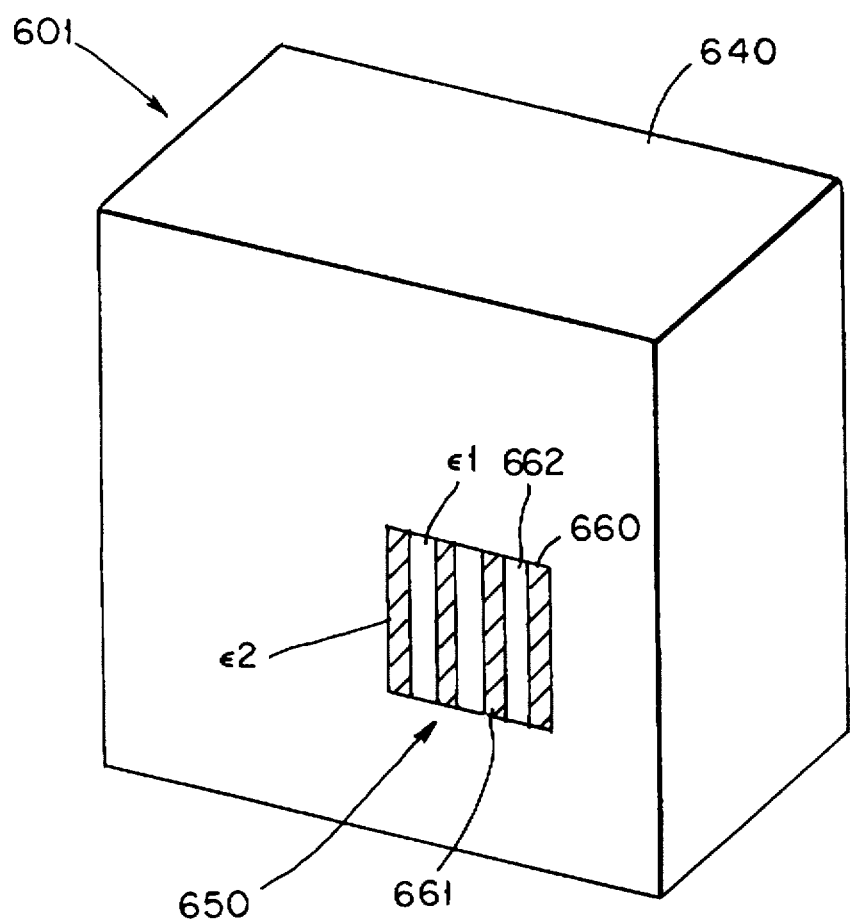
FIGS. 6a–d illustrate an implementation of the dielectric frequency selective surface of the present invention.
Figure 6B:
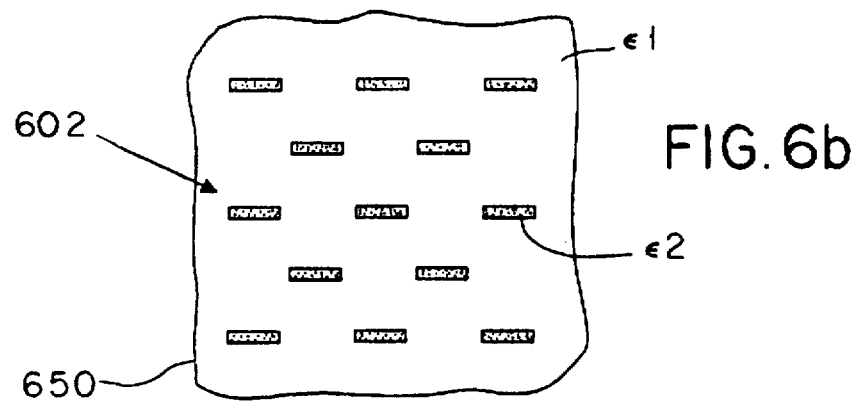
Figure 6C:
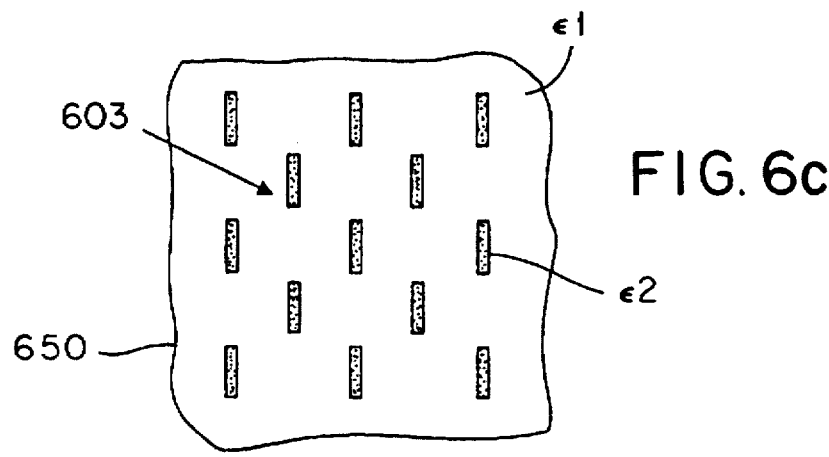
Figure 6D:
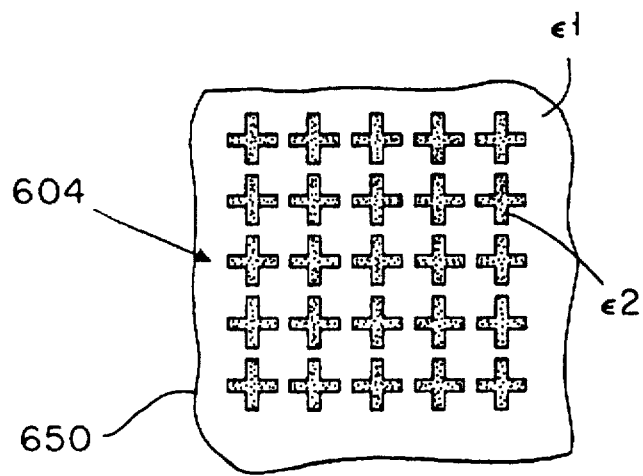

One may choose different periodic patterns 650 to create an FSS with different functionalities. For example, referring to FIG. 6b, slabs or regions 602, are patterned in the electrically insulating insert 650 to match one polarization only. If the polarizations of the wave need to be considered one may pattern a second separate dielectric array or pattern 650 with an orthogonal direction 603 as shown in FIG. 6c, or employ other element shapes 604 illustrated in FIG. 6d such as crosses. Other patterns, like checkerboards or concentric circles, are possible. In this situation, only one slab or region 604 is patterned for dual polarization operation.

The patterning of the various periodic dielectric patterns 605 is accomplished by using a mask (to selectively expose materials to thermal radiation) or a laser (to selectively cure materials). See U.S. Pat. No. 5,397,863 to Afzali-Ardakani et al. which is herein incorporated by reference in its entirety. For example, a laser at a first energy level will be positioned to thermally cure the material to create one or more regions 661 (e.g. strips) with a first dielectric $\epsilon 1$ at a series of positions on the window 660. In addition, the laser can be repositioned with a second energy level (including zero energy level) to produce other regions 662 with a second dielectric constant ε2 at a second set of positions 662 on the window 660. This process could be repeated to create different patterns 650 with regions of different dielectric constants.

More specifically, a high dielectric material can be made by dispersing 6.0 g of CFx (Accufluor 2028 supplied by Allied-Signal) into a premixed solution of 4.5 g Sylgard 184 part A, 0.06 g of GAFAC surfactant and 50 ml toluene. The mixture is partially cured at 100 degrees C. for one hour to remove the solvent. The mixture is then cured at an elevated temperature (e.g. using a high powered laser) in selective regions by exposing the regions to be cured to thermal radiation. The final curing step creates the high-dielectric constant in the exposed regions to form the FSS. The thickness of the FSS can be reduced by using materials with high dielectric constants.

With the communication capability facilitated by the FSS window of the present invention, it is also important to emphasize that the desired EMI shielding property of the electrically conducting enclosures is affected only at frequencies admitted by the FSS window. At all other frequencies, the shielding property is well maintained.

Although the present invention and its advantages have been described in detail, it should be understood that various changes, substitutions and alterations can be made herein without departing from the spirit and scope of the invention as defined by the appended claims.

What is claimed is:

1. A system for providing information about one or more objects within electrically conducting packaging that shields the one or more objects from electromagnetic radiation originating from outside of the packaging without providing such information on an outside surface of the packaging and without requiring the packaging to be opened, comprising:

a radio frequency tag carried by at least one object within the electrically conducting packaging for receiving a first electromagnetic wave having a first carrier frequency and automatically radiating a second electromagnetic wave having a second carrier frequency in response thereto, the radio frequency tag carrying information about the object and the second electromagnetic wave being modulated with the information about said object;

a radio frequency transponder outside of the electrically conducting packaging for transmitting the first electromagnetic wave towards the electrically conducting packaging and for receiving the second electromagnetic wave from the electrically conducting packaging; and a frequency selective surface window in the electrically conducting packaging that permits the first electromagnetic wave to enter the electrically conducting packaging and reach the radio frequency tag and further permits the second electromagnetic wave to exit from the electrically conducting packaging and reach the transponder to thereby communicate the information about the object to the transponder.

2. The system as recited in claim 1, wherein said frequency selective surface window is an aperture that is covered by an electrically conducting coated substrate with periodic patterns of one or more openings that are of a size and have a spacing such that said aperture resonates at said first and second carrier frequencies for one or more wave polarizations.

3. The system as recited in claim 2, wherein said openings have any one or more of the following shapes: patches, crosses, and strips.

4. The system as recited in claim 1, wherein said frequency selective surface window is one or more punched periodic aperture arrays that are put through said electrically conducting packaging, said one or more periodic aperture arrays having openings with a size and a spacing such that said periodic aperture arrays resonate at said first and second carrier frequencies for one or more wave polarizations.

5. The system as recited in claim 1, further comprising a data processing system coupled to said transponder, said data processing system comprising a processor, a storage means, and an input/output means coupled together via a bus, wherein said information communicated to said transponder is transferred to said data processing system via said input/output means.

6. The system as recited in claim 1, wherein said first electromagnetic wave further causes said tag to change a state on a logic circuit on said tag and a further electromagnetic wave interrogates said tag to determine said state of said tag.

7. The system as recited in claim 1, wherein said first and second carrier frequencies are equal.

8. The system as recited in claim 1, wherein said frequency selective surface window is an aperture in said packaging that is covered by an electrically insulating substrate with periodic patterns of one or more dielectric regions that are of a size and have a spacing so that said enclosure aperture resonates at said first and second carrier frequencies for one or more wave polarizations.

9. The system as recited in claim 1, wherein said frequency selective surface window is one or more patterned periodic aperture arrays that are placed in an opening in said electrically conducting packaging, said one or more periodic arrays having dielectric regions with a size and having a spacing so that said periodic arrays resonate at said first and second carrier frequencies for one or more wave polarizations.

10. The system as recited in claim 9 wherein said periodic array dielectric regions have any one or more of the following shapes: patches, crosses, and strips.

11. A system for providing information about an internal part within an electrically conducting enclosure without providing such information on an outside surface of the enclosure and without requiring the enclosure to be opened, comprising:

a radio frequency tag carried by at least one internal part within the electrically conducting enclosure for receiving a first electromagnetic wave having a first carrier frequency and automatically radiating a second electromagnetic wave having a second carrier frequency in response thereto, the radio frequency tag carrying information about the internal part and the second electromagnetic wave being modulated with the information about said internal part;

a radio frequency transponder outside of the electrically conducting enclosure for transmitting the first electromagnetic wave towards the electrically conducting enclosure and for receiving the second electromagnetic wave from the electrically conducting enclosure; and a frequency selective surface window in the electrically conducting enclosure that permits the first electromagnetic wave to enter the electrically conducting enclosure and reach the radio frequency tag and further permits the second electromagnetic wave to exit from the electrically conducting enclosure and reach the transponder to thereby communicate the information about the object to the transponder.

12. The system as recited in claim 11, wherein said frequency selective surface window is an aperture that is covered by an electrically conducting coated substrate with periodic patterns of one or more openings that are of a size and have a spacing such that said aperture resonates at said first and second carrier frequencies for one or more wave polarizations.

13. The system as recited in claim 12, wherein said openings have any one or more of the following shapes: patches, crosses, and strips.

14. The system as recited in claim 11, wherein said frequency selective surface window is one or more patterned periodic aperture arrays that are placed in an opening in said electrically conducting enclosure, said one or more periodic arrays having dielectric regions with a size and having a spacing so that said periodic arrays resonate at said first and second carrier frequencies for one or more wave polarizations.

15. The system as recited in claim 14 wherein said periodic array dielectric regions have any one or more of the following shapes: patches, crosses, and strips.

16. A method for providing information about one or more objects stored within an electrically conducting transport container that shields the one or more objects from electromagnetic radiation originating from outside of the transport container without providing such information on an outside surface of the transport container and without requiring the transport container to be opened, comprising:

forming a frequency selective surface window in an electrically conducting transport container that selectively passes first and second carrier frequencies;

attaching a radio frequency tag to at least one object and storing said tagged object within said transport container, said tag carrying information about the object;

interrogating the transport container with a radio frequency transponder located outside of the transport container, said transponder transmitting a first electromagnetic wave having said first carrier frequency towards the frequency selective surface window in the transport container, said surface window permitting the first electromagnetic wave to enter said transport container and reach said tag, said tag receiving said first electromagnetic wave and automatically radiating a second electromagnetic wave having said second carrier frequency in response thereto, said second electromagnetic wave being modulated with the information about said object, said surface window further permitting said second electromagnetic wave to exit said transport container and reach said transponder; and receiving and demodulating said second electromagnetic wave at said transponder to thereby receive the information about the object at the transponder.

17. The method as recited in claim 16, wherein said frequency selective surface window is an aperture that is covered by a substrate having an electrically conducting coating with periodic patterns of one or more openings that are of a size and have a spacing such that said aperture resonates at said first and second carrier frequencies for one or more wave polarizations.

18. The method as recited in claim 16, wherein said frequency selective surface window has a periodic pattern of one or more patches, crosses, or strips, with the size and spacing thereof adjusted to be resonant at said first and second carrier frequencies for one or more wave polarizations.

19. The method as recited in claim 16, wherein said frequency selective surface window is one or more punched periodic aperture arrays that are put through said electrically conducting transport container, said one or more periodic aperture arrays being of a size and having a spacing such that said periodic aperture arrays resonate at said first and second carrier frequencies for one or more wave polarizations.

20. The method as recited in claim 16, wherein said interrogating step further comprises the steps of transmitting said first electromagnetic wave having said first carrier frequency to cause said tag to change a state on a logic circuit on said tag, and transmitting a further electromagnetic wave having said first carrier frequency to interrogate said tag to determine said state of said tag.

21. The method as recited in claim 16, wherein said first and second carrier frequencies are equal.

22. The method as recited in claim 16, wherein said frequency selective surface window is formed as one or more patterned periodic aperture arrays that are placed in an opening in said electrically conducting transport container, said one or more periodic arrays having dielectric regions with a size and having a spacing so that said periodic arrays resonate at said first and second carrier frequencies for one or more wave polarizations.

23. The method as recited in claim 22 wherein said periodic array dielectric regions have any one or more of the following shapes: patches, crosses, and strips.

* * * * *